United States Patent [19]

Ganssle et al.

[11] Patent Number: 4,964,596
[45] Date of Patent: Oct. 23, 1990

[54] SPACECRAFT STRUCTURE FOR ORBITAL ASSEMBLY AND SERVICING

[75] Inventors: Eugene R. Ganssle, Skillman, N.J.; Alan Lochead, Levittown, Pa.

[73] Assignee: General Electric Company, E. Windsor, N.J.

[21] Appl. No.: 133,164

[22] Filed: Dec. 11, 1987

Related U.S. Application Data

[63] Continuation of Ser. No. 891,393, Jul. 31, 1986, abandoned.

[30] Foreign Application Priority Data

Oct. 30, 1985 [GB] United Kingdom ............... 8526723

[51] Int. Cl.$^5$ ................... B64G 1/40; B64G 1/64
[52] U.S. Cl. ................... 244/158 R; 244/161; 244/172
[58] Field of Search ........... 244/158 R, 159, 161, 244/173, 172; 361/390, 391, 399, 337, 335, 344; 292/54; 200/50 A; 114/249; 213/88; 280/508, 501, 510

[56] References Cited

U.S. PATENT DOCUMENTS

| | | | |
|---|---|---|---|
| 2,609,268 | 9/1952 | Nye | 361/391 |
| 3,467,891 | 9/1969 | Mogle | 361/391 |
| 3,788,259 | 1/1974 | Colin | 114/249 |
| 4,132,373 | 1/1979 | Lang | 244/159 |
| 4,298,178 | 11/1981 | Hujsak | 244/161 |
| 4,471,926 | 9/1984 | Steel, III | 244/158 R |
| 4,607,815 | 8/1986 | Turci et al. | 244/161 |

FOREIGN PATENT DOCUMENTS 0721933 3/1980 U.S.S.R. ............... 361/391

OTHER PUBLICATIONS

Runge, "Space Tug/Spacecraft/Module Exchanger", Mechanism and Machine Theory, 1977, vol. 12, No. 5, pp. 451–462.
Fairchild, "On-Orbit Spacecraft Servicing", Brochure delivered AIAA Tech Display Conference, 1983.
"Assembly and Maintenance of Space Platforms" by Sved, published in the Journal of the British Interplanetary Society, July 1985.
Paper No. AAS 85-398; AAS/AIAA Astrodynamics Specialist Conference; "Eureca Concept and its Potential Evolution Within the Space Station Era"; by R. Mory, Aug. 12-15, 1985, pp. 17 and 18.

Primary Examiner—Galen Barefoot
Attorney, Agent, or Firm—Clement A. Berard, Jr.; William H. Meise; Robert L. Troike

[57] ABSTRACT

A spacecraft structure for orbital assembly and servicing includes a payload module, a propulsion module and a bus module each of these modules includes attachement means for separately attching to the cargo bay of the Shuttle directly and via planar cradles. The bus module includes module docking and latching fittings at each end and matching locking and latching fittings at one end of each of said payload and propulsion modules. The bus module includes sectionalized assemblies forming a matrix of identical cavities adapted to receive orbital replacement submodules that allow easy replacement of equipment in orbit by an astronaut.

17 Claims, 8 Drawing Sheets

SPACECRAFT STRUCTURE FOR ORBITAL ASSEMBLY AND SERVICING

This is a continuation of application Ser. No. 891,393, filed 7/31/86 now abandoned.

This invention relates to a spacecraft structure that comprises a payload module, a propulsion module and a bus module and includes docking assemblies for interconnecting these modules in space for orbital assembly and for servicing the spacecraft.

Satellites in the past have been designed to be fully assembled on the ground, launched and never again subjected to human physical contact. More recently, the Space Shuttle has been used to repair failed satellites, which were fully assembled on the ground and launched. The Fairchild Solar Maximum satellite launched in 1980 was repaired in April 1985 by astronauts from the shuttle. In that case a failed attitude control module was replaced. They also replaced the coronagraph electronics. Removal of the module required a special Goddard/Fairchild servicing tool. The module was large and on the order of 4×4 feet. Although these repairs have been effected on the Solar Maximum satellite, the design of this satellite reflected the fact that the components are inside the spacecraft and were bolted shut using hardware and tools.

It is desirable, therefore, that, with the advent of the Space Shuttle and the opportunity for servicing satellites, we take advantage of the presence of the astronaut and the shuttle and design satellites for assembly and servicing in orbit. It is important that the spacecraft designer not only insures the safety of the astronaut but that he also guarantees that the necessary operations are capable of being performed with the astronauts limited mobility within a pressurized suit. It is further desirable to provide some means for reducing the costs and maximizing the space the satellite takes up in the orbiter's cargo bay.

SUMMARY OF THE INVENTION

In accordance with one embodiment of the present invention a spacecraft for assembly and servicing in orbit is provided by a payload module including mission sensors and equipment with a docking fitting at one end; a propulsion module containing propulsion fuel tanks and thrusters with a docking fitting at one end and a bus module containing a power generation system with docking fittings at both ends adapted to couple to said payload module and said propulsion module fittings. Each of the modules includes Shuttle attachment means for separately attaching each of the modules separately to the cargo bay of the shuttle with the docking fittings of the payload and propulsion modules extending away from the cargo bay for easy attachment to the bus module fitting and the docking fittings being adapted to be fit to each other in orbit to form, when assembled, an in orbit serviceable satellite structure.

BRIEF DESCRIPTION OF THE DRAWINGS

FIGS. 5a through 5d illustrates the bus module structure where

FIGS. 8a, 8b, 8c, 8d and 8e illustrate the locking mechanism for the ORU where more specifically FIG. 8e is a view of the power driven connector mechanism as taken along lines A—A of FIG. 8a.

DESCRIPTION OF THE PREFERRED EMBODIMENTS

Figure 1A:
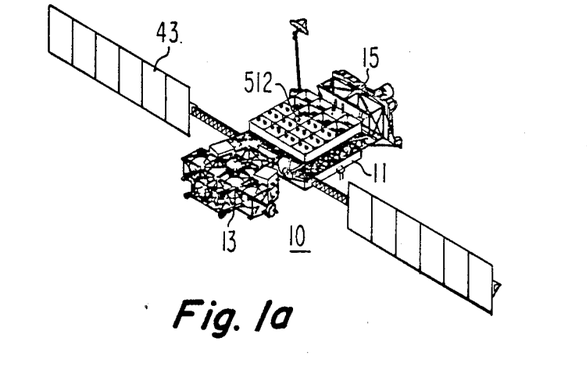
FIGS. 1a and 1b illustrate respectively a perspective and plan view of an in orbit serviceable spacecraft according to the present invention.
Figure 1B:
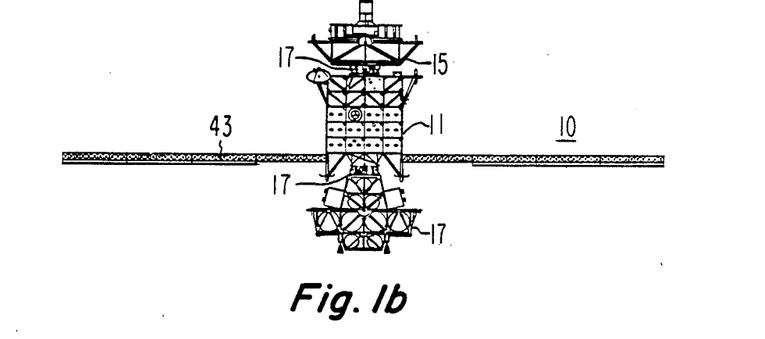

Referring to FIGS. 1a and 1b there is illustrated the spacecraft 10 structure designed for assembly and servicing in orbit and comprises the three major modules of bus module 11, the propulsion module 13 and the payload module 15. These modules are assembled to each other using an orbital docking assembly 17. The bus module 11 includes all the standard support functions such as power, communications, telemetry, data handling and attitude control that are not unique to the particular mission. The payload module 15 includes those unique sensors and process data handling circuits for the particular mission involved. The propulsion module 13 provides all the propulsive equipment including fuel tanks and thrusters. The propulsion module 13 may contain all essential orbit thrusters and fuel tanks to take the satellite to its mission orbit and return it to shuttle orbit, station-keeping thrusters and fuel tanks, and attitude control thrusters and fuel tanks.

These three major modules are initially launched simultaneously but unconnected to each other in the shuttle bay. They are designed to be assembled to each other by the astronauts after the shuttle has obtained its orbit.

Figures 2A, 2B:
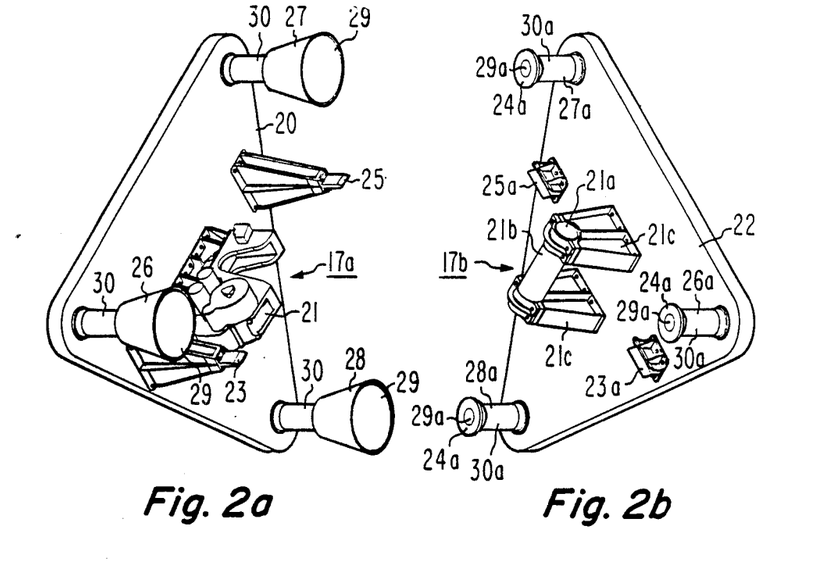
FIG. 2a illustrates the bus docking plate fitting located at both ends of the bus module and FIG. 2b illustrates the payload or propulsion module plate fittings on the payload or propulsion modules.

Referring to FIGS. 2a and 2b, there is illustrated the docking assembly 17. In FIG. 2a there is illustrated the docking plate fittings 17a fixed to each end of the bus module 11. The bus docking plate fitting 17a includes a triangular docking plate 20 bolted to the bus module 11, a cylindrical NASA standard trunnion latch 21 located in the center of the triangular docking plate 20. The trunnion latch 21 includes a motor driven latch assembly remotely controlled from the space shuttle. There are two tonque fittings 23 and 25 on opposite sides of the docking latch 21 and three reaction pads 26, 27 and 28 distributed on the three corners of the docking plate 20. The reaction pads on the bus docking plate fitting include posts 30 that extend from the plate with docking guides or cups 29 at the extended ends of the posts for guiding the reaction pads of the mating assembly. These guides 29 are truncated cones with the narrow end coupled to the posts 30. At the outboard end of the posts where the guides 29 begin are terminating plates (not shown) that are larger in diameter than the posts.

Referring to FIG. 2b, the docking fitting 17b includes triangular plate 22 bolted to the payload module 15 or propulsion module 13 and reaction pads 26a, 27a and 28a at the corners for mating with the reaction pads on the bus docking plate. These reaction pads 26a, 27a and 28a include posts 30a and reaction pad plates 24a at the ends of the posts 30a. The plates on posts 30 of fitting 17a are like the plates 24a on posts 30a. At the center of the plate 22 is located the trunnion 21a adapted to match the NASA motor driven docking latch. The trunnion includes a cylindrical shaft 21b spaced from plate 22 by a pair of supports 21c. Further, there is the groove fittings 23a and 25a at opposite ends of the trunnion. The lengthwise axis of the groove fittings is adapted to match that of the tongue fittings 23 and 25. The lengthwise axis of the groove fittings 23a and 25a is perpendicular to the direction of the cylindrical locking shaft 21b of trunnion 21a.

In accordance with the operation of the docking assembly the docking fittings 17a and 17b are aligned by means of the docking quides 29 so that the reaction pads 26, 27 and 28 are aligned with the reaction pads 26a, 27a 28a and the plates (not shown) of pads 26, 27 and 28 are against plates 24 of pads 26a, 27a and 28a. The three docking guides 29 serve to align the engagement of the trunnion 21a with the latch 21 and the tongues 23 and 25 with the grooves 23a and 25a. After engagement has been completed, an electrical signal actuates the motor actuated trunnion latch 21 which causes it to grip the trunnion 21a and pull the trunnion toward itself and the plates 20 and 22 toward each other. The reaction pad plates 24 like the mating pad plates extend beyond the posts and adjustments to the reaction pad plates 24 assures that they will exhibit a predetermined desired preload (spring load) when the trunnion/latch pull-down is complete. When this occurs, the plates of reaction pads 26, 27 and 28 are slightly depressed against the plates 24 of reaction pads 26a, 27a and 28a to provide a spring loading.

Figure 3:
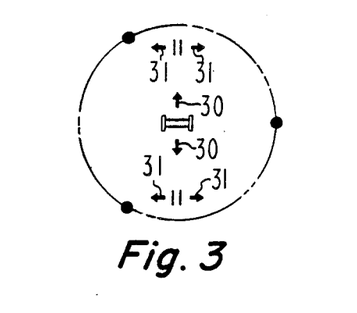
FIG. 3 illustrates the docking plate load paths.
Figure 4:
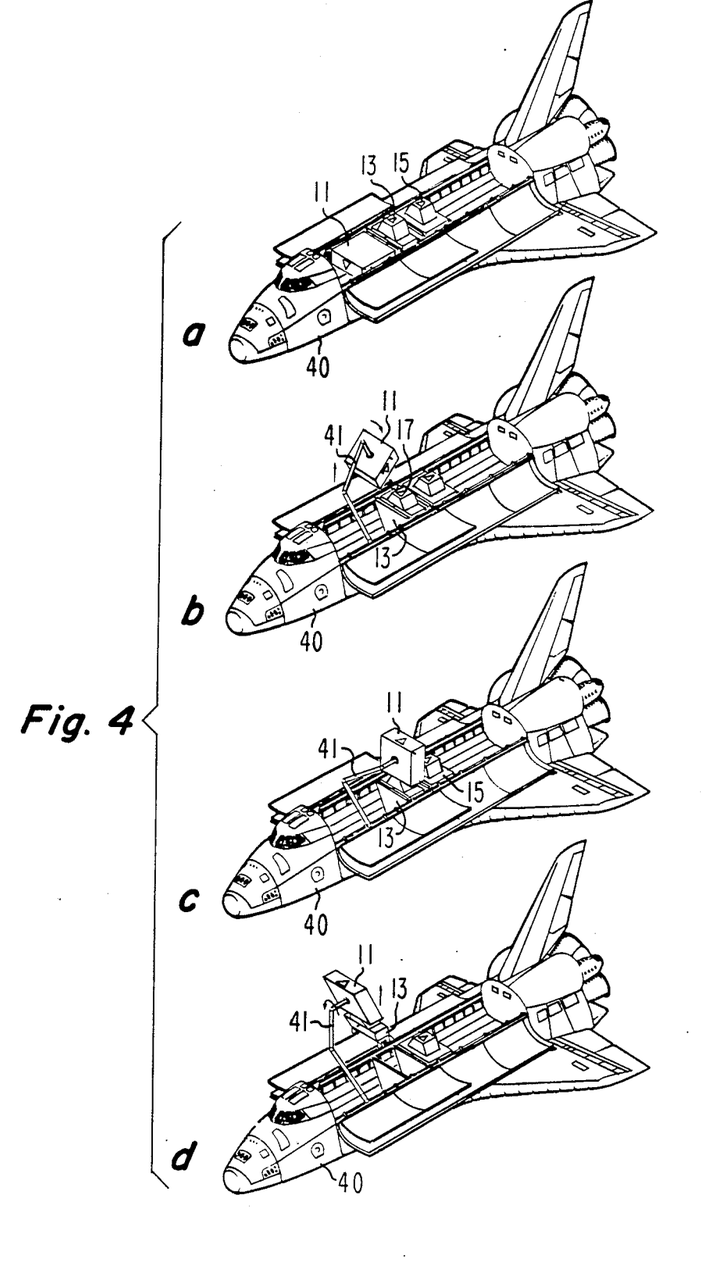
FIGS. 4a through 4g illustrate spacecraft assembly in orbit according to the present invention.

FIG. 3 schematically indicates the load paths at the docking plate interface. As illustrated in FIG. 3, the trunnion fitting supports the assembly in the vertical direction as indicated by arrows 30 as illustrated while the tongue fittings supports in the horizontal direction as indicated by arrows 31 and the dots indicate the preload at the pads. The remote manipulator arm (RMS) of the shuttle can be used to maneuver these docking plates or modules together while, for example, these modules are separately mounted to the cargo bay as illustrated for example in FIGS. 4a through 4g.

Referring to FIG. 4a there is illustrated the shuttle 40 with the separate modules 11, 13 and 15 separately mounted in the cargo bay with bay doors open. FIGS. 4b and 4c illustrates the remote manipulator arm (RMS) 41 being used to move the bus module 11 onto the propulsion module 13 whereupon the docking plate latch assembly 17 discussed in connection with FIG. 2 is energized. The assembly of the bus module 11 and the propulsion module 13 is referred to as the platform. The shuttle latch is opened to allow removal of the bus module 11 but the shuttle latch remains locked at the propulsion module 13 during assembly. The shuttle latch holding the propulsion module 13 is then released and the RMS 41 removes the entire platform from the cargo bay as illustrated in FIG. 4d. As illustrated by FIG. 4d and 4e the RMS rotates the platform 180°. The RMS 41 places the other end of the bus module 11 containing the other bus docking plate fitting (FIG. 2a) on the payload module 15 fitting (FIG. 2b) as illustrated in FIG. 4e. The shuttle latch retains the payload module 15 during assembly. The shuttle latches holding the payload module 15 are then released. FIG. 4f illustrates the spacecraft raised from the shuttle by the RMS, and FIG. 4g shows the spacecraft deployed in space by release of the RMS 41. The solar panels 43 may be deployed after the bus module 11 has been hooked up to the propulsion module 13 and the thus formed platform assembly rotated 180° as illustrated in FIG. 4e. Other assemblies can be considered. For example, instead of docking the modules within the cargo bay it is possible to provide an auxiliary arm or arms to allow the module to be parked outside the cargo bay.

Later in the life of the spacecraft it will be necessary to exchange a new module for an original module. These tasks are accomplished by effecting the rendezvous between the assembled spacecraft and a subsequently launched shuttle which contains replacement modules. In the change out scenario the operation would be similar to that described in connection with FIG. 4 with the replacement modules being located in different positions in the bay and the remote manipulator arm 41 being used to place the expended module in a different position of the bay and then picking up the new module as in the original assembly.

The rendezvous of the shuttle with the spacecraft is an ideal time for servicing the bus module. In accordance with the bus module in the present invention, the bus module is adapted to receive orbital replacement submodules or units which are relatively small in size, such as 26×32 inches, which are very manageable by an astronaut. Referring to FIGS. 5a through 5d there is illustrated the bus module. The bus module 11 includes a central primary structure 501 which carries the primary loads and is an open flat rectangular planar truss assembly having two broad parallel surfaces or major surfaces 503 and 505 spaced by a central core truss structure 504 and having opposite end plates 506 and 507. Docking plates 17a previously described are mounted to opposite end plates 506 and 507 of the planar open truss structure. At the payload docking plate end 507 there is extending from this primary support structure a pair of shuttle interface trunnions 508a and 508b which are adapted to fit into the standard NASA docking latches on the longerons of the shuttle. Extending from the opposite end 506 of the primary structure is a pair of cradle interface trunnions 509a and 509b extending generally in the same direction as the docking elements for the propulsion module docking assembly. Above and below this primary truss structure are sectionalized or egg-crate assemblies 510 and 511 which are bolted or otherwise fixed to the primary structure 501. The sectionalized or egg-crate assemblies essentially consist of cross-plates which intersect each other to form a matrix of cavities each of which is dimensioned to receive an orbital replacement unit (ORU) or submodule containing electronic equipment.

In accordance with a preferred embodiment of the present invention these egg-crate assemblies are arranged so as to provide cavities of essentially identical size and shape and have identical attachment and electrical connector positions. In accordance with the preferred embodiment of the present invention the bus structure is divided up into multiple modules with redundant modules located at different positions and in different module assemblies handling identical redundant operations. The battery bus power system may be located in several submodules. Interconnected similarly, a transponder submodule and its redundant submodule would be located in different sets of submodules for redundancy purposes. Central processing units and the redundant central processing unit would be located in different submodules. A typical spacecraft bus system may include many such submodules, the exact number depending upon the specific servicing philosophy. There would also be spaces where there would be empty cavities to allow for future growth and so the astronaut, in removing one submodule, may place it temporarily in one of the other cavities while putting in a new submodule assembly brought up on the shuttle. Details of these assemblies and their latching means will be discussed later in the specification. The submodules, when attached in the cavities, would transfer their loads directly to the truss structure, and removal of one of the submodules would not affect the structural strength of the other submodules in accordance with the present invention.

Figures 5A, 5C, 5D:
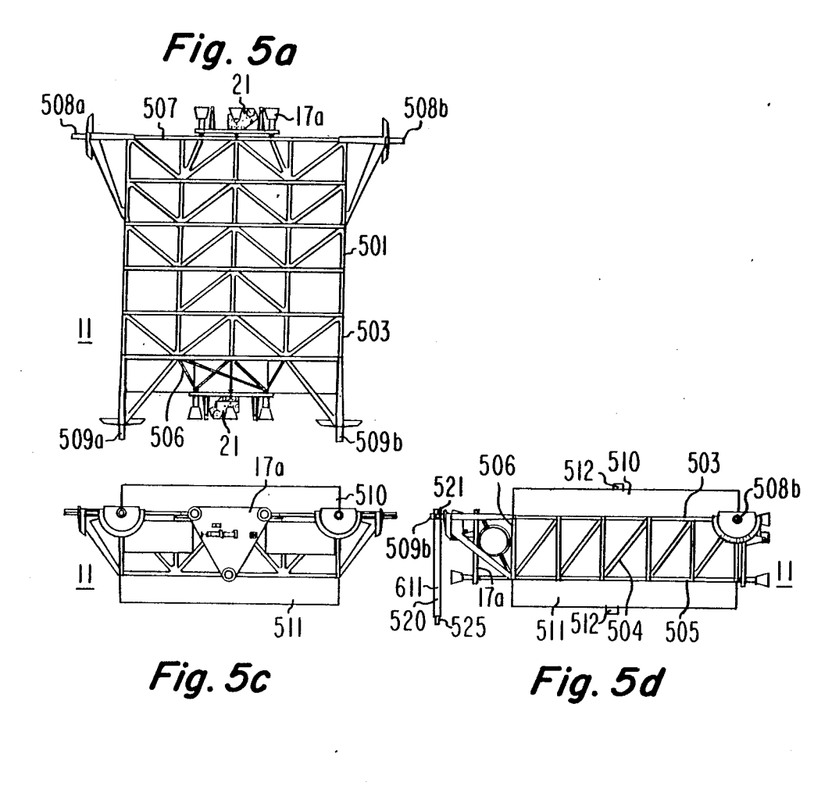
FIG. 5a illustrates a top plan view of the bus module assembly with the Orbital Replacement Unit (ORU) and the ORU support structure removed.
FIG. 5c is one end view of the bus module and FIG. 5d is a side view of the bus module with a triangular support cradle.
Figure 5B:
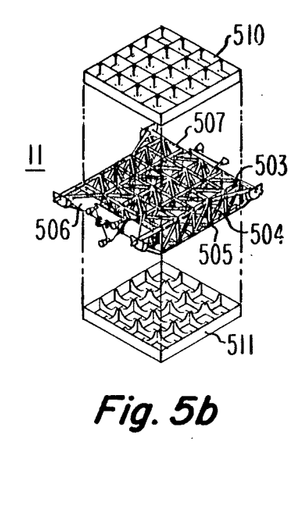
FIG. 5b is an exploded perspective view of the bus module.

The bus module would be mounted in the cargo bay of the shuttle horizontally as shown in FIG. 5d with the STS interface trunnions 508a and 508b extending and latched directly to the top longerons of the cargo bay and the trunnions 509a and 509b at the opposite end via a V-shaped planar cradle 520 as represented by FIG. 5d.

The V-shaped cradle 520 includes a pair of trunnions 521 and a keel fitting 525. The top ORU support structure 510 would face out of the bay and the structure 511 toward the bay with access for ORU replacement in the bay. These structures would have a grappling fixture (512 on FIGS. 1b and 5d) at the center for attachment with the RMS 41 in assembly and servicing.

Figure 6:
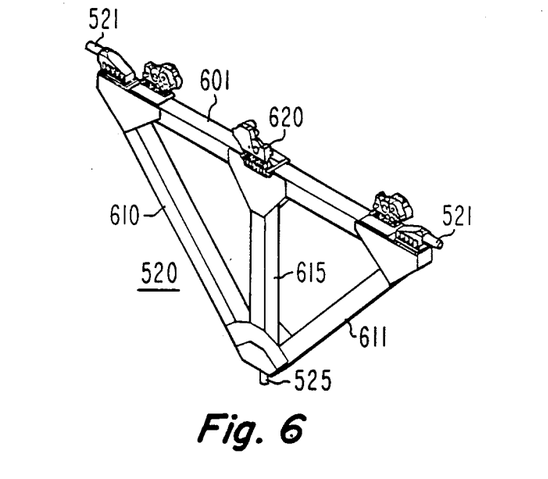
FIG. 6 illustrates the triangle support cradle of FIG. 5.

FIG. 6 is a sketch of this planar cradle that includes a horizontal bar 601 which fits between the trunnions 521 that are coupled to the longerons of the cargo bay. Two angled bars 610 and 611 extend from the ends of the horizontal bar 601 to the keel pin 525 to form a V-shape. The keel pin 525 extends into a keel hole in the cargo bay. A vertical member 615 extends between the V intersection at the keel pin and the center of the horizontal bar 601 to improve the stiffness and strength of the bar. Near each of the trunnions 521 is a NASA standard lightweight latch for connection to the cradle interface trunnions 509a and 509b of the bus module 11. The central latch 620 illustrated would not be used in connection with the bus module but would be used, for example, with the payload module or propulsion module interface to be discussed later.

When this planar cradle is used, the lateral forces on the bus module or payload module are transferred to the keel without transferring to any of the components. Similarly, vertical forces are transferred to the cradle trunnions 521. This planar cradle remains on the shuttle. Due to the thinness of the planar cradle, it does not interfere with the sensor components on the module that it is supporting, and further it allows easy access to the submodules when the bus is attached to the cradle for repair, servicing or the replacement of the submodules.

Figures 7A, 7B:
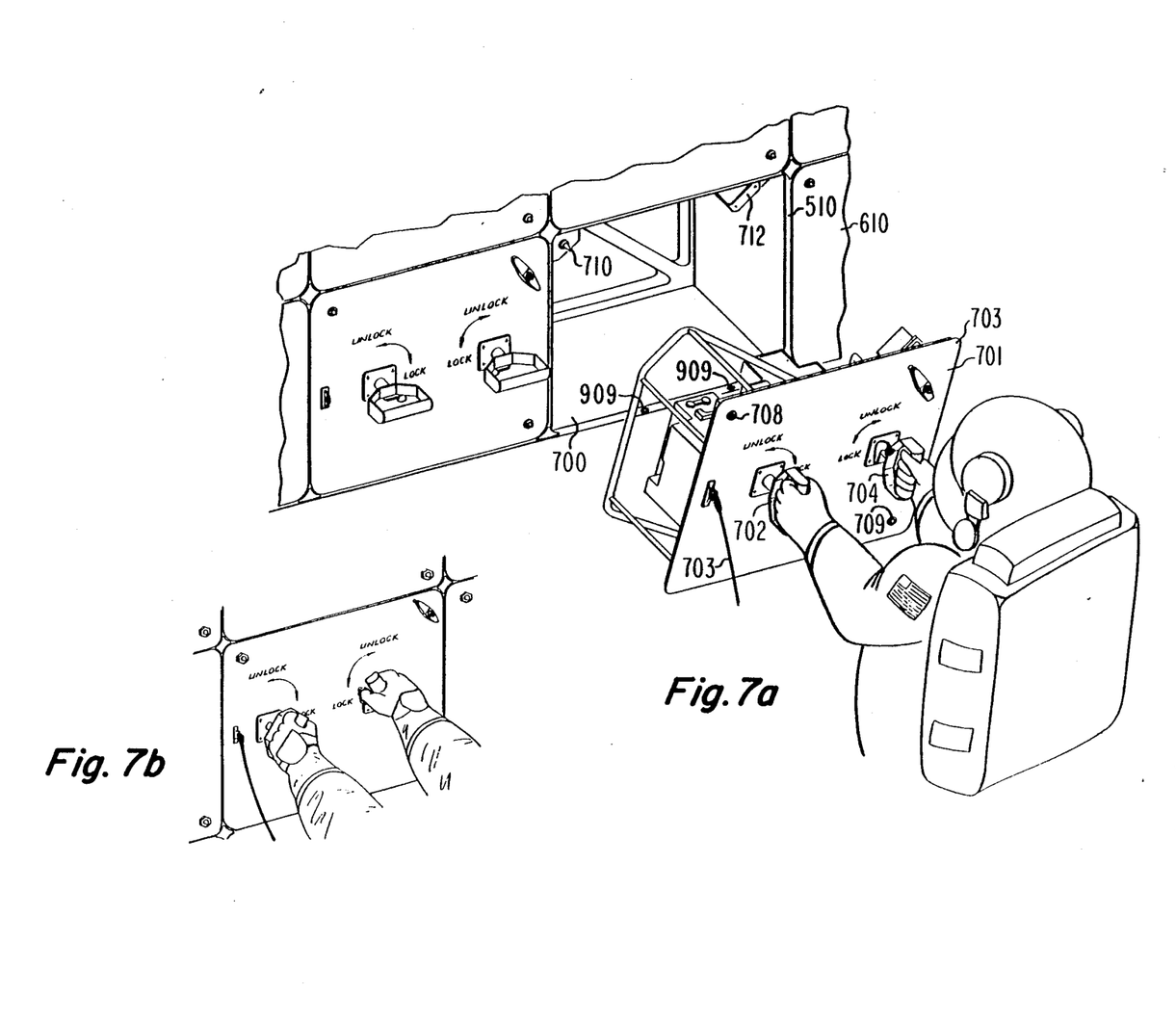
FIG. 7a illustrates an astronaunt removing the Orbital Replacement Unit (ORU) and FIG. 7b illustrates astronaunt locking or unlocking the ORU.

FIGS. 7a and 7b show how an astronaut anchored to the foot restraint (not shown) of the RMS can install and lock an orbital replacement submodule 701 in an empty cavity 700 in the sectionalized egg crate assembly 510. The submodule 701 includes two handles 702 and 704 to enable the astronaut to get a stable grip and to allow him to manipulate the submodule 701 in either direction. A tether cable 703 is shown to the left of the submodule as a positive retainer should he relinquish his grip for any reason. More detail of the locking mechanism of the orbital replacement submodule 701 is illustrated in FIGS. 8a through 8d.

Figure 8A:
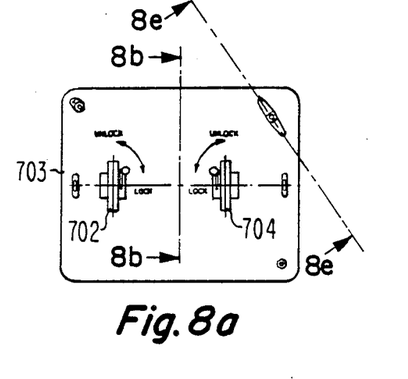
FIG. 8a illustrates the main support plate and handles.
Figure 8B:
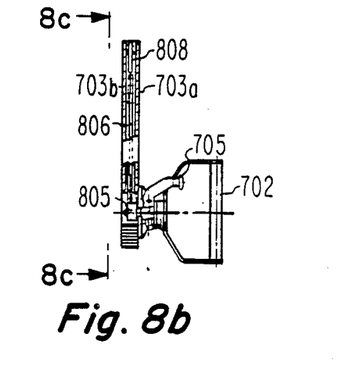
FIG. 8b is a partial cross-section of FIG. 8a taken along lines B—B.

Referring to FIG. 8a there is illustrated the cover plate 703 which itself may be a one-inch honeycomb plate. The two handles 702 and 704 which are centrally located along the vertical dimension are D-shaped handles or grips which are better shown in FIG. 8b. These handles are rotatable when a release button 705 is depressed to move away a locking detent. FIG. 8b is a cross-section of honeycomb plate 703 as taken along line 8b—8b of FIG. 8a. The handles 702 and 704 are coupled to the locking mechanism located between the walls 703a and 703b of plate 703 so that they can be operated by being rotated in opposite directions to avoid inducing any torque which could rotate the astronaut in a weightless environment. A key feature of these orbital replacement submodules is the concept that no fasteners are required to hold them in place or to react to applied loads.

Figure 8C:
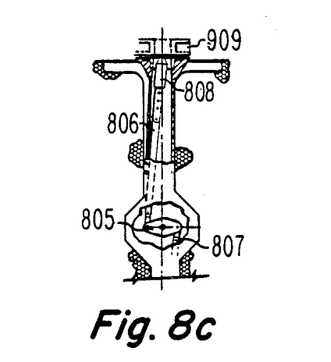
FIG. 8c is a view of the latch taken along lines C—C of FIG. 8b
Figure 8D:
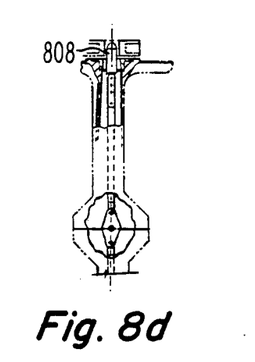

As illustrated in connection with FIGS. 8b and 8c, the mechanism includes an elongated crank 805 within a hollow in plate 703 (formed by walls 703a and 703b) beneath each handle which is rotated by the gripper handle 702 or 704. FIG. 8c illustrates the locking mechanism coupled to the left handle 702. The upper rod 806 is pinned to the left side of crank 805 and the lower rod which extends in the opposite direction is pinned to the right side of the crank. A male shear fitting 808 is attached to the ends of each of the rods. Female shear fittings 909 are located in the top and bottom sectionalized egg crate walls of each cavity. See FIG. 7a. When a grip handle 702 is rotated from an unlocked to locked position, it rotates the crank 90° to be like that shown in FIG. 8d. This action drives the rods so that the male shear fittings 808 drive into the mating holes 909, which are in the walls of the egg crate structure. The locking mechanism under handle 704 is like that shown in FIG. 8c except that upper rod 806 is pinned to the right side of crank 805 and the lower rod 807 is pinned to the left side of crank 805. By this change the ORU is locked or unlocked by rotating the handles in opposite directions. In the locked position the rods and crank are on center so that no unwanted unlocking torques can be induced into the mechanism. Thus, the two grips engage four shear fittings which resist any out of plane loads on the orbital replacement unit or submodule.

At diagonally placed positions 708 and 709 (FIG. 7a) on the honeycomb plate are located mating holes for shear pins 710 extending from the egg crate structure for alignment when the orbital placement unit is installed. One of the shear pins is slightly resilient and is adapted to fit a slightly diagonal aperture in the plate to allow for slight errors in design or temperature changes of the module.

Figure 8E:
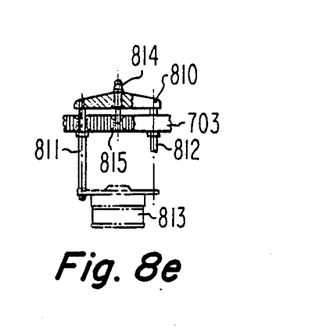

As stated previously, each of these submodules or ORUs includes an electrical connector for power and other electrical connection to a common bus system, for example. Typical connectors, however, require large insertion forces and this is a difficult problem for astronauts. This problem is overcome by a jackscrew arrangement as illustrated in FIG. 8e. As illustrated in connection with FIG. 8e, there is a yoke 810 with two shafts 811 and 812 connected to a male connector plug 813. At the center of the yoke passes a bolt 814 through a threaded piece 815 which is threaded into the plate 703. Using a power tool the bolt 814 pulls the yoke closer to the plate 703 and thereby drives the male connector plug 813 into the standard female connector 712 (FIG. 7a) in the cavity. During installation of the ORU the jackscrew and connector are backed off so that no connector force is felt by the astronaut. After the ORU is locked in place, the astronaut removes his hands from the grips and applies a standard Battery Powered Tool (BPT) to the special captivated bolt 814 at the connector mechanism. A ⅜ - inch ratchet drive or Power Ratchet Tool (PRT) are also available to the astronauts. The jackscrew action draws the connector down into the engagement with its mate inside the egg-crate structure.

Figure 9A:
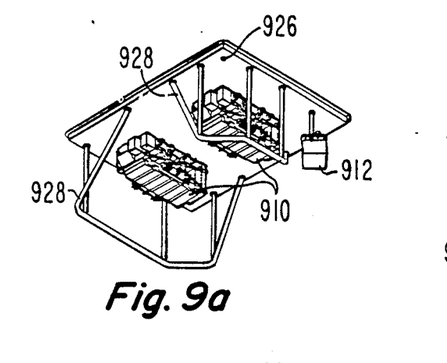
FIGS. 9a, 9b and 9c illustrate the battery ORU, transponder ORU and Control Processing Unit (CPU) ORU respectively.
Figure 9B:
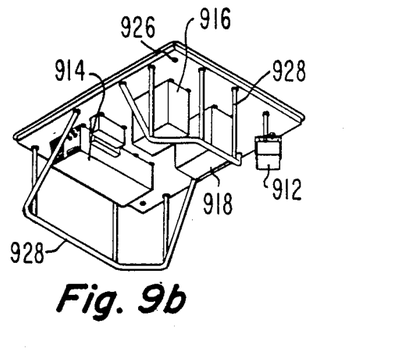
Figure 9C:
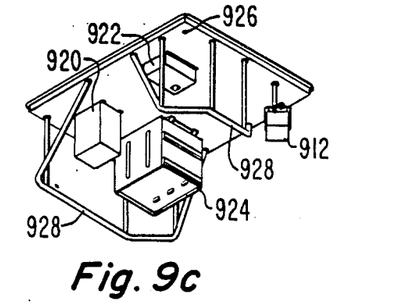

Referring to FIGS. 9a, 9b and 9c there is illustrated the battery ORU (with battery packs 910), the transponder ORU (with transponder 914, uplink processor 916 and data units 918), and the central processor unit ORU (with I/O unit 920, crystal OSC. 922, and CPU processing unit 924), respectively. Note the identical placement of the components, the electrical connectors 912 and the shear pin holes 926. These ORU submodules can therefore be placed anywhere on the bus. Also note the bumperguard rails 928 about the electronics equipment to guard the electronics components and aid in guiding the submodules or ORUs into the cavities.

Figure 10A:
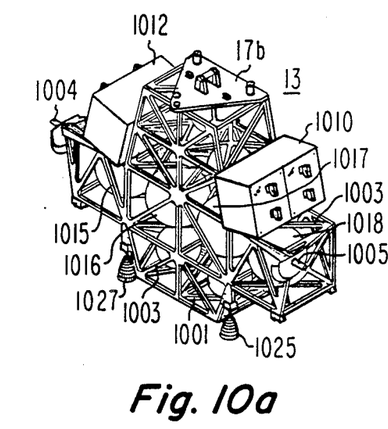
FIG. 10a and 10b illustrate the propulsion module.
Figure 10B:
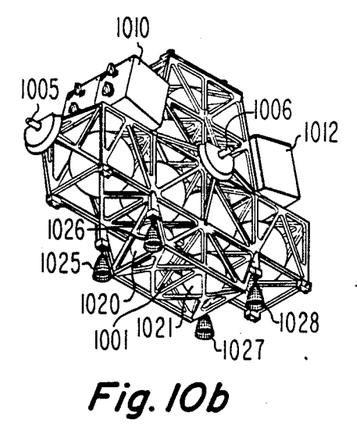

The propulsion module 13 is illustrated in FIGS. 10a and 10b is made up of a closed truss 1001 which is an assembly of planar trusses machined from aluminum alloy plates. Three support trunnions 1004, 1005 and 1006 extend from the structure through which all landing loads are transmitted. Two trunnions 1004 and 1005 make direct interface with the orbiter at the longerons using the standard NASA docking latches. The third trunnion 1006 interfaces with the V-shaped planar support structure discussed previously and uses the center NASA standard lightweight latch 620 of FIG. 6. This standard planar cradle transfers the payload loads to the keel pin. Two-section egg crate cavity structures 1010 and 1012 are located on an outer portion of this propulsion module truss to support four spare ORU submodules. These locations can also be used to carry replaced ORU's from the bus back to earth on a spent propulsion stage.

All propulsion functions provided in this propulsion module are performed by two independent propulsion systems. Transfer between the mission orbit and shuttle orbit is provided by bipropellant systems incorporating four propellant tanks 1015-1018, two high pressure helium tanks 1020 and 1021 and four 445 Newton thrusters 1025-1028 used in redundant opposed pairs. Bipropellant pressurant is located in two high pressure tanks. Nitrogen cold gas thrusters provide propulsive attitude control functions during all phases of the mission. The propulsion systems are sized to accommodate a variety of mission scenarios and payload tasks. Each of the tanks is supported at three points which coincide with the truss nodes. Thrusters 1025-1028 and bipropellant engines are supported by brackets on the primary truss structure. The docking plate 17b is bolted at the end opposite the four main engines or thrusters.

Figure 11:
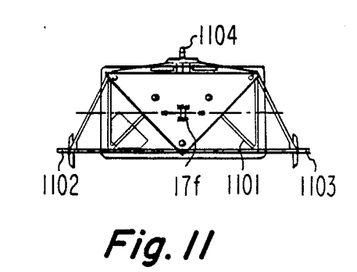
FIG. 11 illustrates the payload module.

The payload module 15 illustrated in FIG. 11 comprises, as mentioned previously, the payload itself and support structure which are unique to the mission. The structure offers the same interface between a payload and the platform and between the payload and the orbiter for launching and landing. The structure is an aluminum alloy truss 1101. Three trunnions 1102, 1103 and 1104 provide the launch load paths identical to those of the propulsion module with the pair of trunnions 1102 and 1103 adapted for direct connection to longerons to the shuttle orbiter and the cradle trunnion 1104 for attachment to center latch on the V-shaped planar cradle 520 (See FIG. 6) in the manner discussed previously in connection with the propulsion module. The docking plate 17b is illustrated in FIG. 2b and is located at one end of the module and preferably to the shuttle outboard end of the module 15. As the payload module is partly supported by the planar cradle during launch, there is no need for a support structure to extend down to the keel fitting of the orbiter. This launch support concept not only eliminates the potential structure blockage of the payload field of view but is readily expanded to accommodate larger payloads. Also, the openness of the structure as mounted in the cargo bay allows access for repair by an astronaut.

What is claimed is:

1. A latching assembly for linking one spacecraft module with another in space, comprising in combination:
    a first docking plate adapted to be mounted at one end to one spacecraft module and a second docking plate adapted to be mounted at one end to the mating spacecraft module;
    said first docking plate including a centrally located trunnion latch and a first plurality of reaction pads equally spaced from the latch;
    said second docking plate including a trunnion centrally located to mate with said latch and a second plurality of reaction pads equally spaced from the trunnion to mate with the reaction pads on said first docking plate;
    a funnel shaped docking guide extending from said first or said second of said plurality of reaction pads to guide the plates together and effect engagement of the trunnion with the latch;
    tongue and groove fittings;
    one of a pair of tongue or groove fittings being located on said first plate on opposite sides of said trunnion latch, and the mating one of groove or tongue fittings being located on said second plate on opposite sides of said trunnion.

2. A method for transporting a disassembled spacecraft into space by use of an Earth-to-space transport vehicle including a cargo bay and a manipulable arm, and for assembling said spacecraft in space, said spacecraft comprising (a) a payload module including mission sensors and mission equipment, and also including a first docking fitting at one end thereof, and (b) a propulsion module including fuel tanks and thrusters, and also including a second docking fitting at one end thereof, and (c) a bus module including electric power generation, communications and data handling systems, and also including at one end thereof a third docking fitting adapted to mate with said first docking fitting and at the other end thereof a fourth docking fitting adapted to mate with said second docking fitting, comprising the steps of:

mounting said payload module in said cargo bay with said first docking fitting facing out of said cargo bay;

mounting said propulsion module in said cargo bay with said second docking fitting facing out of said cargo bay;

mounting said bus module in said cargo bay;

using said arm, removing said bus module from said cargo bay, and positioning said bus module so that one of said third and fourth docking fittings dock with one of said first and second fittings, respectively, to thereby couple together said bus module and one of said payload and propulsion modules to form a partial spacecraft;

using said arm, removing said partial spacecraft from said cargo bay, and positioning said partial spacecraft so that the other one of said third and fourth docking fittings docks with the other one of said first and second fittings to form an assembled spacecraft;

using said arm, removing said assembled spacecraft from said bay; and releasing said assembled spacecraft from said arm.

3. A method according to claim 2 further comprising the step of translating at least one solar panel relative to said bus module after said step of removing said bus module from said bay to produce an extended solar panel.

4. A method for transportation of a disassembled spacecraft into space and for assembly in space of said spacecraft, comprising:

mounting in the cargo bay of an Earth-to-space transport vehicle a payload module of said spacecraft bearing mission sensors and mission equipment at one end thereof and a first docking fitting at the other end thereof, said payload module being mounted in said cargo bay with said first docking fitting facing out of said cargo bay;

mounting in said cargo bay of said transport vehicle a propulsion module of said spacecraft including propulsion fuel tanks and thrusters, and also including a second docking fitting at one end thereof, said propulsion module being mounted in said cargo bay with said second docking fitting facing out of said cargo bay;

mounting in said cargo bay a bus module of said spacecraft including electric power generation, communications and data handling systems, and also including at one end thereof a third docking fitting adapted to mate with said first docking fitting and at the other end thereof a fourth docking fitting adapted to mate with said second docking fitting;

using a manipulable mechanical arm of said transport vehicle, removing said bus module from said cargo bay, and positioning said bus module with one of said third and fourth docking fittings docked with one of said first and second docking fittings, respectively, to form a partially assembled spacecraft;

using said manipulable mechanical arm, removing said partially assembled spacecraft from said cargo bay;

using said manipulable mechanical arm, positioning said partially assembled spacecraft with the other one of said third and fourth docking fittings docked with the other one of said first and second docking fittings, respectively, to form an assembled spacecraft;

using said manipulable mechanical arm, removing said assembled spacecraft from said cargo bay; and releasing said assembled spacecraft from said manipulable mechanical arm.

5. A method according to claim 4 further comprising the step of translating at least one solar panel relative to said bus module after said step of removing said bus module from said bay to produce a deployed solar panel.

6. An earth-to-space transporter vehicle including a manipulable mechanical arm and a cargo bay loaded with a disassembled spacecraft to be transported into space for assembly, comprising:

a payload module of said spacecraft, said payload module including mission sensors and mission equipment, and also including a first docking fitting at one end thereof, said payload module being mounted in said cargo bay with said first docking fitting facing out of said bay;

a propulsion module of said spacecraft, said propulsion module including fuel tanks and thrusters, and also including a second docking fitting at one end thereof, said propulsion module being mounted in said cargo bay with said second docking fitting facing out of said bay; and a bus module including electric power control, communications and data handling systems, and also including at one end thereof a third docking fitting adapted to mate with said first docking fitting and at the other end thereof a fourth docking fitting adapted to mate with said second docking fitting, said bus module being mounted in said cargo bay at a location accessible by said mechanical arm.

7. An arrangement according to claim 6 wherein one of said first and third docking fittings, and one of said second and fourth docking fittings, includes a trunnion latch fitting, and the other one of said first and third docking fittings, and the other one of said second and fourth docking fittings, includes a trunnion shaft fitting.

8. The combination of claim 7 wherein said trunnion latch fittings are motor driven, and further comprising reaction pads including posts with resilient metallic plates at the ends which are pre-loaded when the motor driven latch causes it to grip the associated trunnion shaft fitting and pull it into the associated trunnion latch fitting.

9. An arrangement according to claim 7 wherein said trunnion latch fittings are motorized.

10. An arrangement according to claim 7 wherein each of said first, second, third and fourth docking fittings includes a docking plate, and wherein said trunnion latch fittings are each located at the center of one of said docking plates, and further comprising a pair of one of tongue and groove fittings mounted with one element of each said pair on each side of each of said trunnion latch fittings.

11. An arrangement according to claim 7 wherein each of said first, second, third and fourth docking fittings includes a docking plate, and wherein said trunnion latch fittings are each located at the center of one of said docking plates, and further comprising reaction pad fittings equally distributed about said trunnion latch fittings on each of said docking plates.

12. An arrangement according to claim 11 wherein the number of said reaction pad fittings on each said docking plate is three.

13. An arrangement according to claim 6 wherein one of said first and third docking fittings, and one of said second and fourth docking fittings includes a tongue fitting, and the other one of said first and third docking fittings, and the other one of said second and fourth docking fittings, includes a mating groove fitting.

14. An arrangement according to claim 13 wherein each of said docking fittings includes a docking plate, and wherein the number of said tonque or groove fittings on each said docking plate is two.

15. An arrangement according to claim 6 wherein said first, second, third and fourth docking fittings include reaction pad fittings.

16. An arrangement according to claim 6 wherein said bus module comprises a central truss structure with first and second opposed broad surfaces, each of said first and second broad surfaces bearing a matrix of cavities adapted to receive orbital replacement submodules.

17. An arrangement according to claim 16 wherein said submodules are identical in size, shape and means for attachment and electric connection to said cavities.

* * * * *